W. S. JEAL.
MEANS FOR STARTING INTERNAL COMBUSTION ENGINES.
APPLICATION FILED OCT. 27, 1919.

1,359,896.

Patented Nov. 23, 1920.

# UNITED STATES PATENT OFFICE.

WILLIE SAMSON JEAL, OF WEST NORWOOD, LONDON, ENGLAND.

MEANS FOR STARTING INTERNAL-COMBUSTION ENGINES.

1,359,896.

Specification of Letters Patent. Patented Nov. 23, 1920.

Application filed October 27, 1919. Serial No. 333,736.

*To all whom it may concern:*

Be it known that I, WILLIE SAMSON JEAL, a subject of the King of Great Britain, residing at West Norwood, London, S. E. 27, England, have invented a new and Improved Means for Starting Internal-Combustion Engines, adapted also to be used for generating electric current, of which the following is a specification.

This invention relates to electric motors and has for its object to provide an improved construction and arrangement thereof for electrically starting internal combustion engines and adapted also to be used as a dynamo for recharging accumulators for lighting or other purposes.

According to the invention the armature shaft of an electric motor is arranged, when the motor is supplied with electric current from accumulators, to drive an engine shaft at a speed less than that of the armature shaft to start the engine, means being provided whereby the armature shaft is driven at the same speed as the engine shaft when the motor is being driven as a dynamo to generate electric current to recharge the accumulators or for other purposes.

Reference will now be made to the accompanying drawings in which:—

Figure 1:
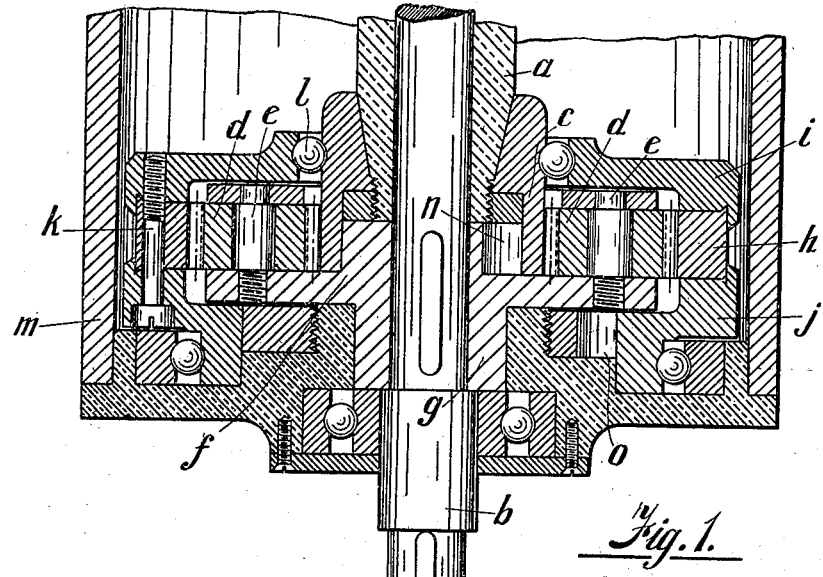
Figure 2:
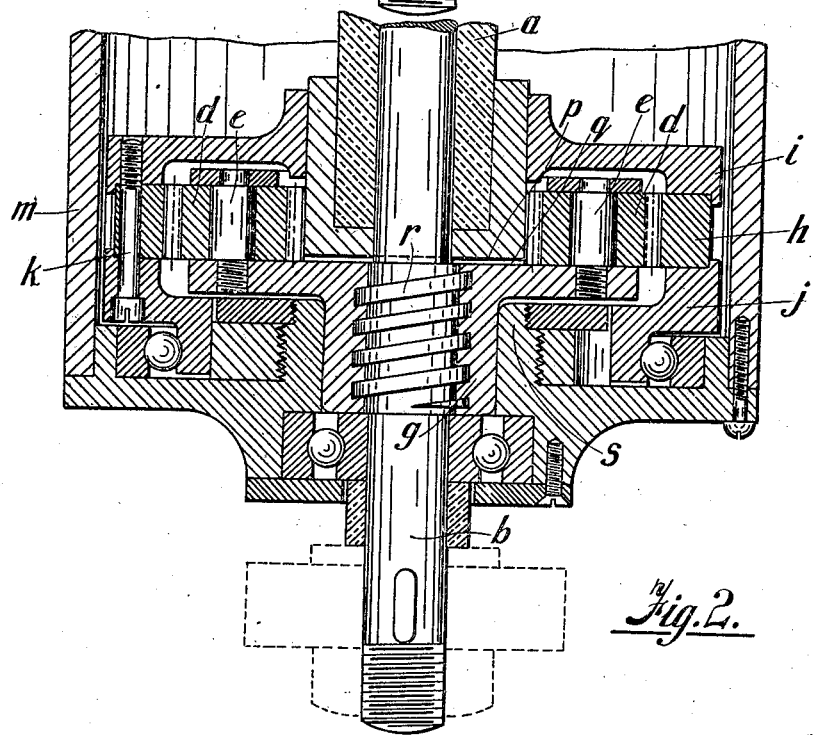

Figure 1 is a sectional plan of an arrangement constructed according to the invention and Fig. 2 is a sectional plan of a modified arrangement.

Referring first to Fig. 1, $a$ indicates the shaft of an armature of an electric motor (not shown) said shaft being loosely mounted with respect to a shaft $b$ which may be integral with the crank shaft of an internal combustion engine or connected therewith. Secured to the end of the hollow shaft $a$ is a toothed wheel or sleeve $c$ the teeth of which are in permanent engagement with a number of toothed pinions $d$ disposed in planet fashion around the wheel $c$ and each being rotatably mounted on a short shaft $e$ fixed in a disk or spider $f$, the central boss $g$ of which is keyed or otherwise secured to the shaft $b$.

Surrounding the planet pinions $d$ and in permanent engagement therewith is an internally toothed ring $h$ maintained in position by disks $i$ and $j$ engaging each side of the said ring and secured thereto by any suitable means such as the bolts $k$. Ball bearings $l$ are disposed between the disk $i$ and the boss of the wheel $c$ and between the disk $j$ and the interior of the fixed motor casing $m$.

A free wheel clutch device one portion of which appears at $n$ is formed between the interior of the toothed portion of the wheel $c$ and the boss $g$ so that these two parts are locked against relative movement in one direction while being independently rotatable at different speeds in the opposite direction.

A similar arrangement is made between the disk $j$ and the casing $m$ as indicated at $o$ so that the toothed ring $h$ can only rotate in one direction, namely in the direction in which the wheel $c$ is also free to rotate.

The operation of this form of the invention is as follows:—

Electric current from suitable accumulators is supplied to the armature which is mounted on the shaft $a$ and which may be series or compound wound. The armature is so arranged as to be driven in the direction in which the wheel $c$ can rotate freely with respect to the boss $g$. The rotation imparted by the armature shaft $a$ to the wheel $c$ is transmitted to the pinions $d$ which tend thereby to rotate the toothed ring $h$ in a direction opposite to that of the shaft $a$. The free wheel connection $o$ however, prevents such rotation of the ring $h$ with the result that the disk or spider $f$ and the pinions $d$ carried thereon are caused to rotate and to travel around said ring $h$, thereby rotating the shaft $b$ at a slower speed than that of the armature shaft $a$, and thus starting the engine.

After the engine has started, the shaft $b$ will be caused to rotate at a much greater speed than that at which it was rotated during the starting operation and its rotation is transmitted through the spider $g$, pinions $d$ and toothed wheel $c$ to the shaft $a$ and motor which in this case acts as a (simple) dynamo. A field is created which causes the armature to lag, thereby causing the wheel $c$ to become locked through the free wheel connection $n$ to the spider $g$ and shaft $b$ so that all the parts rotate together, the dynamo generating current to recharge the accumulators.

Referring now to the arrangement illustrated in Fig. 2, parts of similar construction to the corresponding parts of Fig. 1 are indicated by the same reference numerals and will not be further described. The modification consists in the elimination of the free wheel connection between the shaft *b* and the wheel *c* and in substituting therefor a pair of friction clutch surfaces. The wheel *c* is formed with one clutch surface at *p* and the disk or spider *f* is formed with the other at *q* while the disk *f* instead of being keyed to the shaft *b* as in the first arrangement is formed to engage a screw thread *r* formed on said shaft.

The operation of this form of the invention is similar to that of the arrangement shown in Fig. 1. The screw thread *r* is so formed that during the operation of starting an engine the spider *f* is caused by said thread to move in a direction away from the wheel *c*. Its movement in this direction being limited however by the annular inner ring of the ball bearing beneath and the spider becomes fast with the shaft *b* and imparts its rotation thereto to start the engine. To assist in carrying the thrust upon the ball bearing a washer is placed between the pinion (shown in dotted lines) said washer bearing against the inner ring of ball bearing.

When the engine attains its normal speed and drives the shaft *b* the action of the screw thread *r* will be to cause the spider *f* to move toward the wheel *c* whereby the clutch surfaces *p* and *q* will engage and the armature shaft *a* be driven at the same speed as the shaft *b*.

It is to be understood that the invention is not limited to the spur wheels and pinions illustrated, as the wheel *c* and the ring *h* may each be replaced by bevel wheels and the pinions *d* by bevel pinions carried on the spider in such a manner that their respective axes are at right angles to the axis of the shaft *b*.

A suitable switch may be employed in conjunction with special windings on the armature to enable the latter to act as a simple shunt wound dynamo armature after the engine has started. Also a cut out device may be employed to prevent overcharging of the accumulators and if desired a clutch or other suitable arrangement may be provided to enable the engine to be disconnected entirely from the shaft.

When the invention is applied to automobile engines, the latter may after starting drive the dynamo to charge accumulators used for lighting purposes but the invention is not limited in this respect as the accumulators may be used for any desired purpose.

I claim:—

1. In a device for starting internal combustion engines adapted also to be used for generating electric current, an armature shaft, an engine shaft, a pinion carried by said armature shaft, planet gears in mesh with said pinion and carried by means rotatable with said engine shaft, a gear rotatable in one direction only, in mesh with said planet gears, and a one-direction clutch device directly interposed between said pinion and said engine shaft.

2. In a device for starting internal combustion engines adapted also to be used for generating electric current, an armature shaft, an engine shaft, a pinion carried by said armature shaft, a spider mounted upon said engine shaft, planet gears in mesh with said pinion and carried upon said spider, a gear rotatable in one direction only in mesh with said planet gears, a clutch member formed upon said pinion, a clutch member formed upon said spider adapted to engage said first named clutch member, and means whereby rotary motion of said engine shaft relative to said spider in one direction causes said clutch members to be brought into engagement.

3. In a device for starting internal combustion engines adapted also to be used for generating electric current, an armature shaft, an engine shaft, a pinion carried by said armature shaft, a spider carried by said engine shaft, planet gears carried by said spider and in mesh with said pinion, an internally toothed gear in mesh with said planet gears, a fixed casing, a one direction clutch device, interposed between said internally toothed gear and said casing, and a further one direction clutch device directly interposed between said pinion and said spider.

In testimony whereof I affix my signature in presence of two witnesses.

WILLIE SAMSON JEAL.

Witnesses:
 FRANK E. WOOTTON,
 ALBERT E. HILL.